US012687476B2

(12) United States Patent  
Beck et al.

(10) Patent No.: US 12,687,476 B2  
(45) Date of Patent: Jul. 21, 2026

(54) METHOD FOR CHARACTERIZING A COATING

(71) Applicant: MTU Aero Engines AG, Munich (DE)

(72) Inventors: Florian Beck, Munich (DE); Steven Piorun, Munich (DE); Sascha Buettner, Karlsfeld (DE); Manuel Hertter, Munich (DE); Christoph Rau, Groebenzell (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/719,051

(22) Filed: Apr. 12, 2022

(65) Prior Publication Data

US 2022/0334036 A1 Oct. 20, 2022

(30) Foreign Application Priority Data

Apr. 14, 2021 (DE) ...................... 10 2021 109 359.7  
Jun. 15, 2021 (DE) ...................... 10 2021 115 492.8

(51) Int. Cl.  
*G01N 9/02* (2006.01)  
*C23C 4/129* (2016.01)

(52) U.S. Cl.  
CPC ............... *G01N 9/02* (2013.01); *C23C 4/129* (2016.01); *G01N 2009/024* (2013.01)

(58) Field of Classification Search  
CPC ............... G01N 9/02; G01N 2009/024; G01N 2009/022; C23C 4/129; C23C 4/18; G01B 11/0616; G01B 11/20; G01B 11/00; G01B 11/2518; G01B 11/30; F01D 25/285; F01D 21/003; F01D 11/122; F05D 2260/83; F05D 2260/12; F05D 2270/804; F05D 2230/90; F05D 2230/72; F05D 2230/311; G01F 17/00  
See application file for complete search history.

(56) References Cited

U.S. PATENT DOCUMENTS 4,783,341 A 11/1988 Packer et al.  
5,175,601 A * 12/1992 Fitts ................... G01B 11/2513  
250/237 G (Continued)

FOREIGN PATENT DOCUMENTS

CN 102507370 * 6/2012  
CN 102507370 A 6/2012

(Continued)

OTHER PUBLICATIONS

Mendricky, "Analysis of Measurement Accuracy of Contactless 3D Optical Scanners", MM Science Jouirnal Oct. 2015, pp. 711-714. (Year: 2015).*

(Continued)

*Primary Examiner* — Katherine A Bareford  
(74) *Attorney, Agent, or Firm* — Hinckley, Allen & Snyder, LLP; David R. Josephs

(57) ABSTRACT

The present invention relates to a method for characterizing a coating, in which method a mass and/or a volume of a basic body is/are measured prior to coating; a mass and a volume of the basic body with the applied coating are measured; for characterizing the coating, a density of the coating is determined from the volume and mass measurements; wherein the volume is optically measured.

7 Claims, 3 Drawing Sheets

(56) References Cited

U.S. PATENT DOCUMENTS

| | | | | |
|---|---|---|---|---|
| 5,311,286 | A | * | 5/1994 | Pike ..................... G01B 11/303 |
| | | | | 250/237 G |
| 6,165,542 | A | | 12/2000 | Jaworowski et al. |
| 2003/0003021 | A1 | * | 1/2003 | McGrath ............. B01J 19/0046 |
| | | | | 422/131 |
| 2003/0170119 | A1 | * | 9/2003 | Fried .................... F01D 11/122 |
| | | | | 415/173.4 |
| 2004/0035614 | A1 | * | 2/2004 | Zhang ................... G01G 21/28 |
| | | | | 177/180 |
| 2004/0067116 | A1 | * | 4/2004 | Feist ...................... B23Q 15/08 |
| | | | | 82/1.11 |
| 2005/0118735 | A1 | | 6/2005 | Mantz et al. |
| 2009/0153877 | A1 | * | 6/2009 | Grosskurth ............ G01B 21/20 |
| | | | | 356/601 |
| 2010/0220429 | A1 | * | 9/2010 | Norieda ................. H01G 11/32 |
| | | | | 361/502 |
| 2011/0287269 | A1 | * | 11/2011 | Stamm .................... C23C 30/00 |
| | | | | 420/588 |
| 2014/0199163 | A1 | * | 7/2014 | Lee ....................... C04B 41/009 |
| | | | | 415/174.4 |
| 2016/0252389 | A1 | * | 9/2016 | Esser ................... G01G 19/303 |
| | | | | 177/25.13 |
| 2017/0136743 | A1 | * | 5/2017 | Yoshida ................. B32B 7/022 |
| 2020/0317561 | A1 | * | 10/2020 | Arnold ...................... C03C 4/02 |
| 2021/0292964 | A1 | * | 9/2021 | Zhong ................... C08J 9/0061 |

FOREIGN PATENT DOCUMENTS

| | | | |
|---|---|---|---|
| CN | 104132613 | B | 1/2017 |
| CN | 209166634 | * | 7/2019 |
| DE | 3873972 | T2 | 1/1993 |
| DE | 4130237 | * | 3/1993 |
| DE | 69020791 | T2 | 3/1996 |
| DE | 10024366 | C1 | 1/2002 |
| DE | 102007011728 | * | 9/2008 |
| DE | 102007011728 | A1 | 9/2008 |
| DE | 102019215936 | A1 | 4/2021 |
| EP | 3816572 | A1 | 5/2021 |
| JP | 11-337384 | * | 12/1999 |
| JP | 2014211395 | A | 11/2014 |
| WO | WO-2020052524 A1 | * | 3/2020 .......... A41D 31/065 |
| WO | 2020165336 | A1 | 8/2020 |
| WO | 2021051197 | A1 | 3/2021 |

OTHER PUBLICATIONS

Palousek, et al "Effect of matte coating on 3D optical measurement accuracy", Optical Materials 40 (2015), pp. 1-9. (Year: 2014).*

Azarmi, Fardad and Sevostianov, Igor, "Comparative micromechanical analysis of alloy 625 coatings deposited by air plasma spraying, wire arc spraying, and cold spraying technologies," Mechanics of Materials 133 (2020) 103345, Science Direct, Elsevier, https://pdf. sciencedirectassets.com/271553/1-s2.0-S0167663619308804/main. pdf?x-Amz-Date=20210219T122300Z&X-Amz-Algorithm= AW4-.

ASTM International, ASTM B311-17, "Standard Test Method for Density of Powder Metallurgy (PM) Materials Containing Less Than Two Percent Porosity" Last Updated May 11, 2017, https:// civileng.co/astm-b-311-93-reapproved-2002e1-pdf-free-download/.

* cited by examiner

METHOD FOR CHARACTERIZING A COATING

BACKGROUND OF THE INVENTION

The present invention relates to a method for characterizing a coating.

During operation, the components of an aircraft engine, for example, may be subjected to high temperatures, pressures, as well as a number of changes in load. Based on these conditions of use and the high material stress, high requirements may ensue even during manufacture, e.g., with respect to machining precision. For example, the maintaining of a minimum gap between the rotating blades and the stationary housing of a compressor may be of importance. As an example, during so-called running into the stationary housing, the ends or tips of the rotating blades are subjected to a direct frictional contact with the housing.

For this reason, the housing may be coated with a so-called run-in lining in order to reduce the wear on the tips of the rotating blades. The run-in lining can also improve the seal between the ends or tips of the rotating blades and the stationary housing. Housings with a run-in lining are known from the prior art. These run-in linings can be particularly introduced as a coating, and the present Application is directed to the characterizing of a coating that has been applied. In general, said coating is not limited to run-in linings, but the preceding explanations shall only illustrate a particularly advantageous field of application.

SUMMARY OF THE INVENTION

The technical problem of the present invention is based on proposing an advantageous method for characterizing a coating.

This is solved according to the method of the present invention. In this case, prior to coating, a mass and/or a volume of a basic body is measured. After the coating has been applied onto the basic body, the coated basic body is weighed and its volume is measured optically. A difference in the mass and the volume before and after coating the basic body is determined and a density of the coating is determined therefrom. Overall, one obtains different parameters for characterizing the coating, such as the density and also its volume and its mass.

Conducting this method, in particular the optical volume measurement, for example, offers the advantage that determination of the density can be produced over a greater layer volume than a mechanical measurement of samples, by way of example, e.g., manually produced cuboids that are cut out e.g., from a run-in lining and smoothed for the measurement (wherein fractures, etc. may also occur). The method can also make possible nondestructive measurements that are not only precise and rapid, but also can be comparatively easily carried out. In general, the optical measurement can also reduce any influence of the sample geometry or layer thickness. In comparison to a hardness or microhardness measurement at local measurement points, for example, the point scatter can also be smaller, especially in the case of non-homogeneous layers.

Preferred embodiments are found in the dependent claims and the overall disclosure, wherein, in the presentation of the features, a distinction is not always made individually between device, method, and/or use aspects; in any case, the disclosure is to be read implicitly with respect to all claim categories. If, for example, an advantage of the device is described in a specific application, this is likewise to be understood as a disclosure of a corresponding use.

The basic body can be a separate sample for monitoring the process or a component that is specific for use in the turbomachine. If a plurality of layers of different materials should be applied onto a basic body, then with repeated sequences of steps i) and ii), a particular layer can be separately characterized; likewise, the layer sequence can be measured by a measurement at the beginning and at the end, but also can be measured integrally. The basic body may also already have another layer or layer sequence, onto which the coating to be characterized will be applied (it is thus not necessarily homogeneous). The present method can also be well automated in an on-going manufacturing process; thus, for example it can also make possible a detection of damage or a quality monitoring by way of a deviation from layer parameters defined in advance.

Possible optical measurement methods for the volume measurement comprise, for example, a variation in focus or a cycle time measurement (for example, a so-called time-of-flight method). Among other things, optical measurement makes it possible to digitize the surface shape of objects without contacting them and to present them three-dimensionally, so that volume can be determined. The application of an optical measurement method, in comparison to radiometric density measurements, can be of advantage also relative to occupational health and safety. In addition, a radiometrically measured value would also be indirect and, in comparison, would need calibration, which in principle would also be true for x-ray or ultrasound methods. The direct measurement of density via volume and mass, for example, can also help shorten iteration cycles during parameter development and sometimes these iteration cycles can be entirely avoided.

Also independently of specific optical measurement methods, here the basic body can be arranged in a holder, in particular, can be inserted into a holder, and is preferably securely held therein against slipping. e.g., magnetically or also by another fixation method (e.g., by force fit and/or form fit. Preferably, it is freely positionable to a certain extent, but then can be held fixed in place, which can reduce manual handling expenditure, for example. A one-point holder can increase the measurement surface and/or measurement precision. The actual volume measurement can then also be automated, for example, which can be promoted by a uniform geometry of the basic body (e.g. button shape). By way of example, in a corresponding algorithm, the basic body geometry can also be stored or taken into consideration, which, e.g., can accelerate the automated procedure of volume measurement.

According to one preferred embodiment, the optical measurement of the volume is conducted in a structured-light projection method. For example, light structured by a projector (e.g., stripes) can be projected onto the basic body to be measured and can be recorded by at least one camera. The surface gradient and from this the volume can be determined in the case of known positions of the projector and the camera from the deviation between the theoretical ("undisturbed") and the measured actual stripe position (triangulation). To illustrate this, structured-light projection method devices are known in and of themselves and are commercially available, e.g., in the Atos product line of the GOM company.

In one preferred embodiment, the density of the basic body is known and only the volume or the mass, preferably the latter, is measured prior to the coating. The measurement of the mass, e.g., the irradiated basic body, can be conducted relatively quickly and easily, and with the known density the volume of the basic body can then be determined. The generally possible additional optical volume measurement can increase the precision.

According to one preferred embodiment, during the optical measurement of the volume, a surface roughness of the coating is also optically measured. The surface roughness indicates uneven sites or bumps on the surface, among other things, for example, also a so-called open porosity and can offer an additional characterization of the coating. The measurement of the surface roughness is preferably conducted at the same time as the optical measurement of the volume, so that, for example, any adverse effect of the throughput does not occur.

In a preferred execution of the method, the measured body is digitized during the optical volume measurement; therefore, a digital three-dimensional model (CAD model) is created. The measured body designates, among other things, the object detected by a measurement and can be both a basic body as well as a coated basic body. The surface roughness of the coating, which is depicted in the model, can be post-processed for comparing with a mechanical measurement; for example, it can be smoothed by a software post-processing (e.g., filling in the valleys between the roughness peaks).

Preferably, this post-processing is integrated into an automated measurement program, wherein the sensitivity of the correction function used for the smoothing can be individually controlled. This digital post-processing can make possible a better comparison with a mechanical measurement, in which, for example, measurement is made with measurement calipers. In this case, the measurement calipers are only applied to the roughness peaks of the surface, for which reason, a mechanical measurement with the mechanical calipers can result in a difference in measurement, especially in the case of very small geometries.

According to a preferred embodiment, the layer thickness of the coating amounts to at least 0.05 mm and a maximum of 5 mm, wherein the upper and lower limits also shall be disclosed independently from one another. Additional lower limits may lie, for example at 0.08 mm, 0.1 mm, 0.5 mm or 1 mm. Also, independently from the density, the coating, in particular, may involve a thermally sprayed layer, which, for example, can be characterized directly in the sprayed state ("as sprayed"), and/or after a heat treatment.

In the case of one preferred embodiment, a surface to be measured, particularly a shiny surface, is treated with a means for reducing reflections prior to the optical measurement. The surface to be measured may be both the surface of the coating as well as the surface of the basic body. By way of example, chalk spray or titanium dioxide can be applied to the surface, which thus will whiten the surface. for example, in order to reduce possible disruptive reflections during the optical measurement. Another possibility is the matting of the basic body by a corresponding processing method such vibratory grinding or as tumbling.

The invention also relates to a method for producing a component for a turbomachine, for example, an aircraft engine, in which the component is coated and the density of the coating is determined in a way that is presently disclosed. In general, the characterization of the coating can also be produced on the component itself; the latter or the underlying workpiece can thus be the "basic body". The component is preferably coated, and is coated in parallel, for example in the same coating process, as a basic body that is different from the component, for the characterization of the coating. Such samples can be produced in a continuous manufacturing process and can have the same coating as the manufactured components. The coating of the components can be characterized thereby on the basis of the measurement values of the samples, e.g., even when the component as a whole is too large for the optical measurement system.

According to one preferred embodiment, the coating is applied by thermal spraying, e.g., by flame spraying, high-speed flame spraying, or plasma spraying. For illustration, by way of example, $CoNiCrAlY/BN/PE$, $WC/Co$, $Cr_3C_2/NiCr$ or also $CuNiIn$ can be applied as coating layer materials (depending on the application in each case), but the present method can be applied, of course, also to other layer materials. Thermally sprayed layers may have a certain roughness or porosity, for example, for which reason a volume measurement could be falsified due to displaced water caused by water penetration; thus, in contrast, the optical volume measurement is of particular advantage. For example, a thermally sprayed layer system having an adhesive layer and a cover layer may also be applied, wherein the layer system overall can be characterized (step ii prior to applying the adhesive layer, step iii after the cover layer) or also only the cover layer (step ii after applying the adhesive layer).

In one preferred embodiment, the coating, particularly a thermally sprayed coating, is heat-treated after it is applied. By way of example, this can serve for a burning off, e.g., of polyester. In this case, the step iii), thus the measurement of volume and mass, is preferably carried out prior to the heat treatment. For example, prior to a longer waiting time (several hours, e.g., at least five hours), a certain process reliability can be effectively created thereby, for example, of whether a post-processing is necessary. This can be of advantage overall in terms of time, thus relative to throughput. Optionally, after the heat treatment, a volume and mass measurement can then be conducted once more.

Preferably, the component can be a housing part of the turbomachine, in particular of the compressor or of the fan in the run-in region of an aircraft engine or of the turbine. Preferably, the coating can be a run-in lining of the housing part, particularly a run-in lining of the compressor or of the fan or of the turbine.

The invention also relates to a device for characterizing a coating. The device has a holder for the arrangement of the basic body, e.g., a holding device (see above). For purposes of the optical volume measurement of the basic body arranged in the holder, the device provides an optical volume measurement unit, which can comprise, e.g., a projector and a camera. For measurement of the mass of the basic body arranged in the holder, it further provides a weighing unit, e.g., a precision balance.

In addition, the device provides a control unit, whereby the latter is furnished for the purpose of setting up the measurement and weighing unit for carrying out the above-described measurement procedures. A computer program is provided, which has commands that, during execution thereof by the control unit to induce the control unit to initiate and carry out steps i) to iii). Additionally, it is equipped for the purpose of determining a density of the coating from the volume and mass measurements. The optical measurement system and the weighing unit can be designed as integrated, for example, which permits the determination of the weight during the optical measurement, thus resulting in an additional time advantage. Beyond this, the device can make possible an automated recording of other layer parameters, such as, e.g., the layer thickness, it can transmit the data (e.g., the volume model) to a quality assurance system and file it therein, and it can permit an evaluation of the recorded data within the framework of a statistical process control (SPC).

The invention also relates to a computer program product, which has commands that set it up to undertake the described method steps by a control unit of such a device during execution.

BRIEF DESCRIPTION OF THE DRAWINGS

The invention will be explained in more detail in the following on the basis of an example of embodiment, wherein the individual features in the scope of the independent claims can also be essential to the invention in another combination, and wherein also no distinction is made individually between the different claim categories.

Taken individually.

DESCRIPTION OF THE INVENTION

Figure 1:
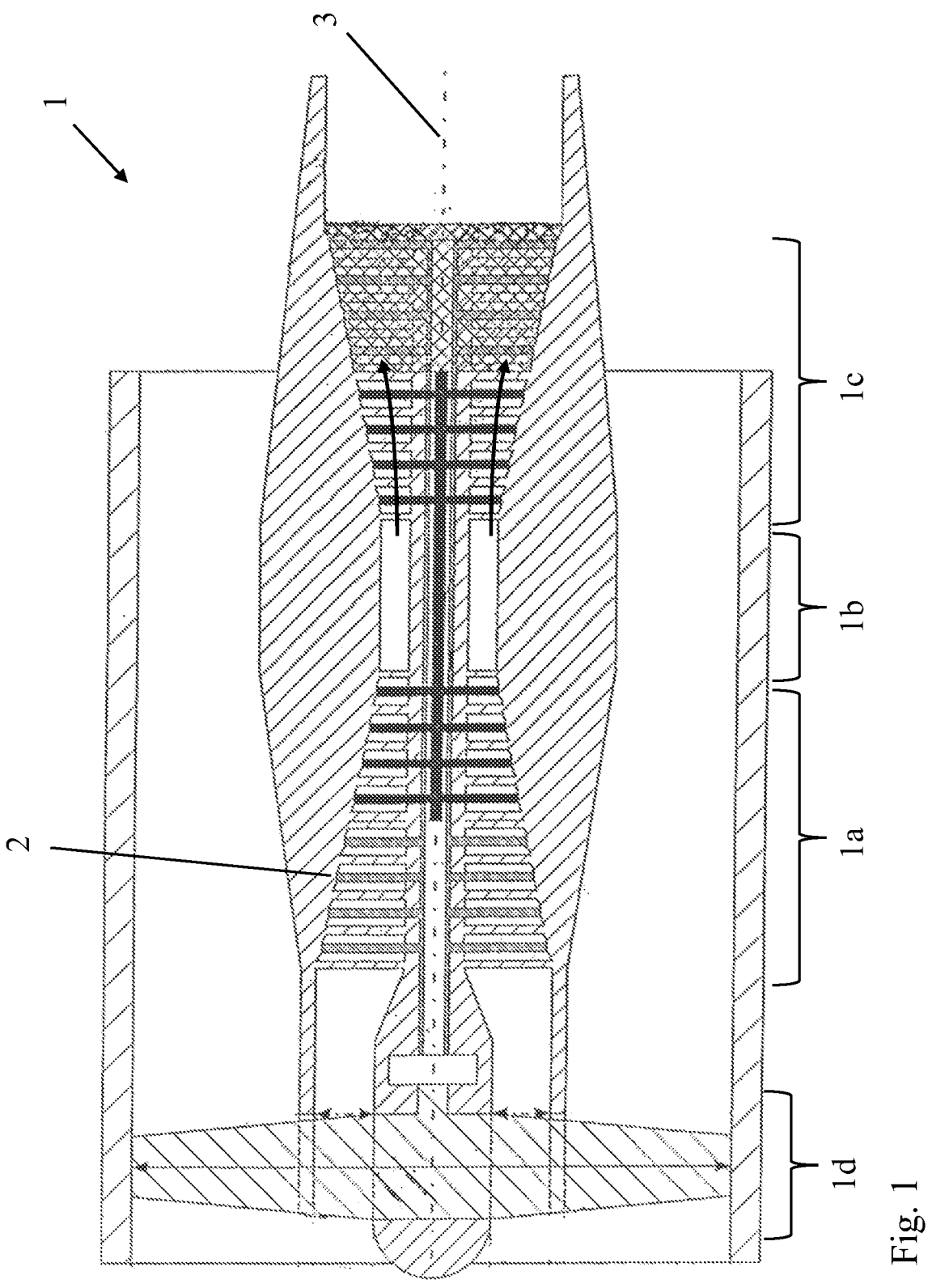
FIG. 1 shows a jet engine in an axial section.

FIG. 1 shows a turbomachine 1, concretely a turbofan engine, in an axial section. The turbomachine 1 is functionally divided into compressor 1a, combustion chamber 1b, turbine 1c, and fan 1d. Both the compressor 1a as well as the turbine 1c are each constructed of several stages; each stage is composed of a guide vane ring and a rotating blade ring. During operation, the rotating blade rings rotate around the longitudinal axis 3 of the turbomachine 1. Here, the aspirated air is compressed in the compressor 1a, and then burned in the downstream combustion chamber 1b along with kerosene mixed in. The hot gas is expanded in the turbine 1c and propels the rotating blade rings. The housing part 2 of the compressor 1a can be provided, for example, with a so-called run-in lining.

Figure 2:
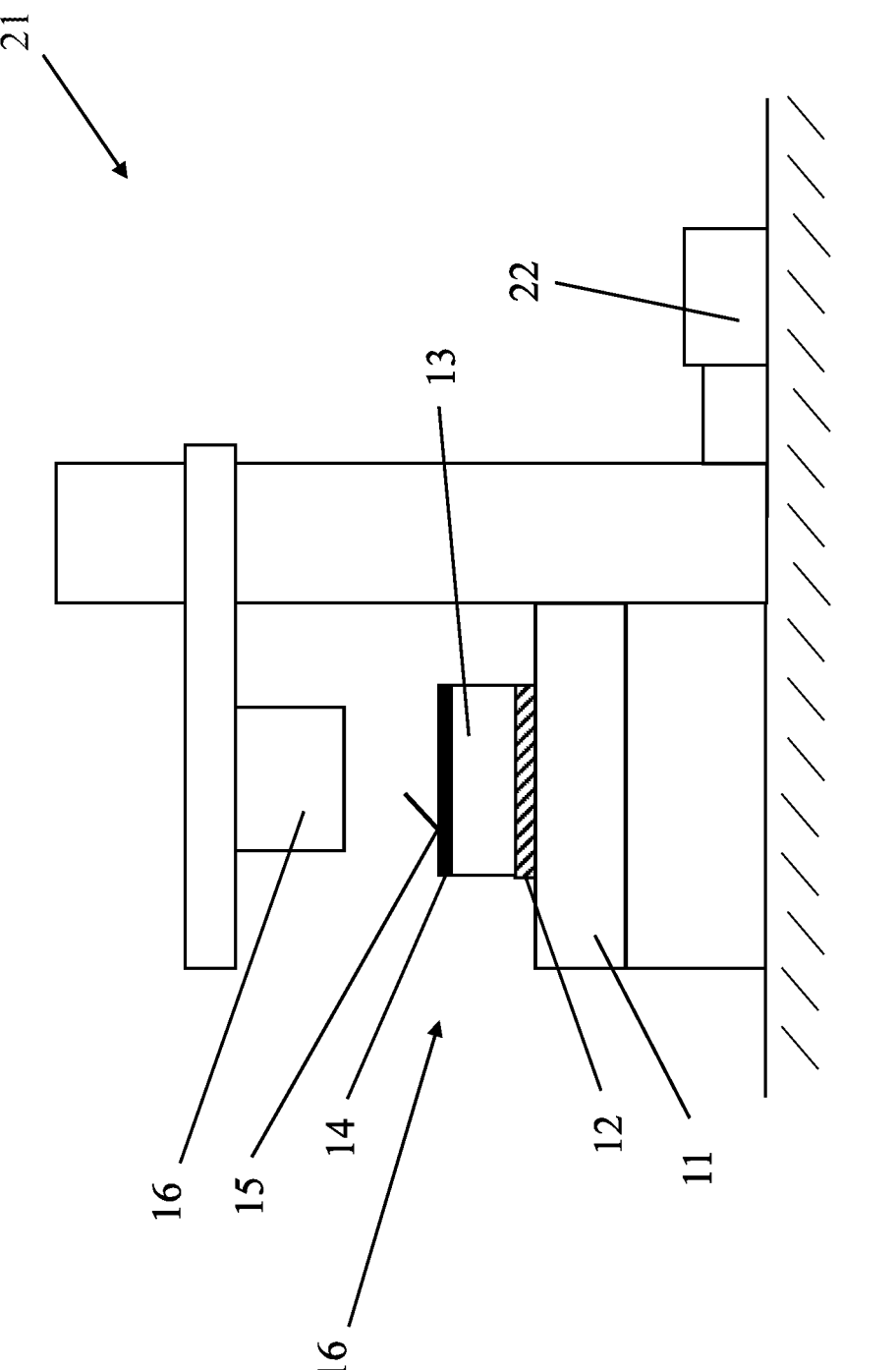
FIG. 2 shows a device for characterizing a coating according to the invention in a schematic representation.

FIG. 2 shows a device 21 for characterizing a coating 14 according to the invention in a schematic representation, for example, a run-in lining. The device 21 comprises a holder 12 for the arrangement of a basic body 13, an optical measurement unit 16 for the volume measurement of the basic body 13 arranged in the holder 12, a weighing unit 11 for the measurement of the mass of the basic body 13 arranged in the holder 12, and a control unit 22. The optical measurement unit 16 comprises a projector and two cameras in a three-dimensional measurement system (not shown individually); the measurement takes place in a structured-light projection method.

Prior to the coating, the weighing unit 11 measures the mass of the basic body 13, and in this example. its volume is also measured by the optical measurement unit 16. After the coating, the volume and the mass of the basic body 13 with the applied coating 14 are measured; from this, its density is determined for characterizing the coating. The depicted integration of optical and weight measurement is given by way of example; in general, the weight measurement can also be produced independently from the volume measurement with a separate weighing unit.

Figure 3:
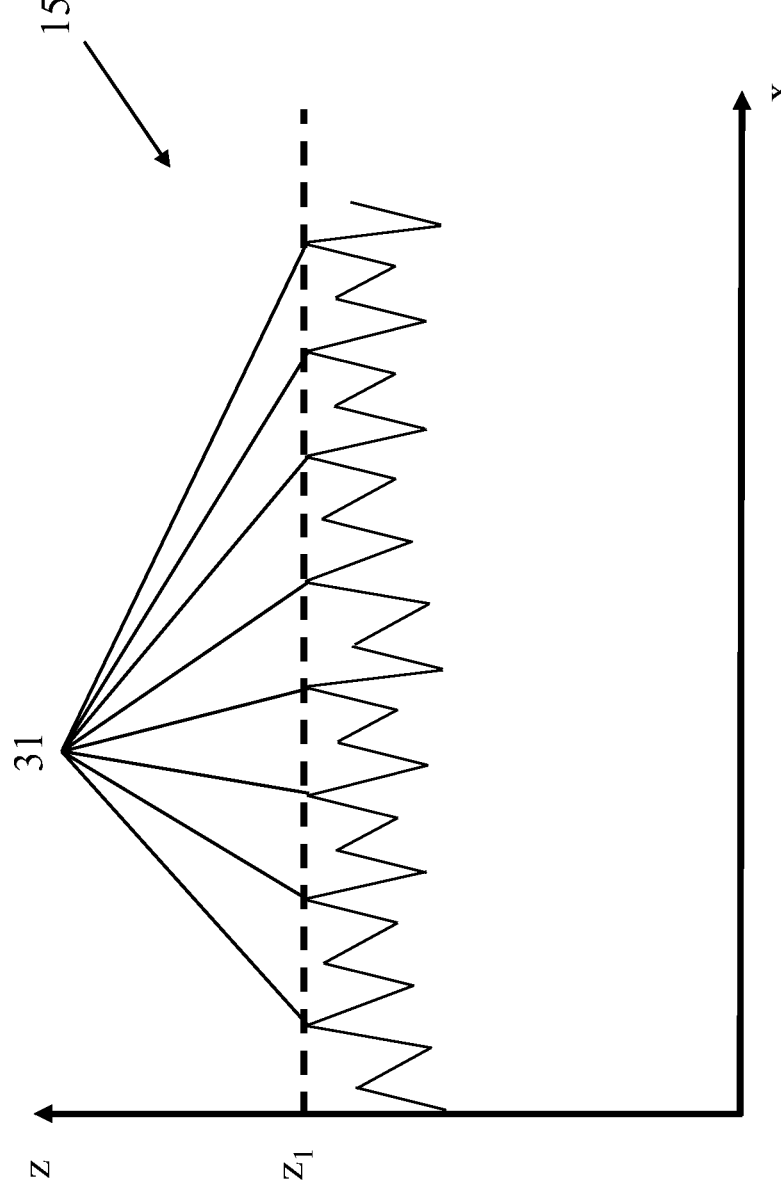
FIG. 3 shows the surface roughness of the coating of FIG. 2 in a schematic representation.

FIG. 3 shows in a schematic representation in a digital model the optically measured roughness of the surface 15 of the coating 14. The roughness peaks of the surface 15 are referenced by the reference number 31. The reference character $z_1$ references a smoothing of the surface roughness in order to eliminate the roughness peaks 31. In this way, the measurement can be compared with a mechanical measurement, for example with a measurement calipers.

What is claimed is:

1. A method for assessing quality of a thermally sprayed run-in lining coating on a housing of a turbomachine, comprising the steps of:

providing a housing component having a surface;

measuring a mass and optically measuring a volume of the housing component using a projector and two cameras in a three dimensional structured-light projection measurement system;

prior to optically measuring, treating the surface of the housing component to reduce reflections by spraying chalk on the surface, applying titanium dioxide to the surface, matting of the surface by vibratory grinding or matting by tumbling;

thereafter, thermally spraying a run-in coating on the housing component; the run-in coating having a surface roughness with roughness peaks;

defining a density of the run-in coating from layer parameters in advance;

thereafter, measuring a mass and optically measuring a volume of the same housing component with the applied run-in coating thereon;

thereafter, determining a difference in the mass and volume before and after coating of the housing component, thereafter, determining a density of the run-in coating from the difference in the mass and volume before and after coating of the housing component;

detecting damage or monitoring quality of the run-in coating by way of a deviation from the density defined in advance;

wherein the housing component is securely held in a holder before and after the coating;

monitoring quality of the run-in coating from the deviation of the density thereof before and after coating of the housing component;

automatically recording data of the layer parameters;

evaluating the recorded data within a framework of a statistical process control;

wherein the surface roughness of the coating is smoothed by software post-processing to fill in valleys between the roughness peaks so it can be compared to a mechanical measurement of the coating;

mechanically measuring the housing component with calipers applied only to the roughness peaks of the surface of the housing component; and comparing the software post-processing with the mechanical measuring of the housing component with calipers.

2. The method according to claim 1, wherein, during the optical measurement of the volume, the surface roughness of the coating is optically measured at the same time.

3. The method according to claim 1, wherein the coating has a layer thickness of at least 0.05 mm and a maximum of 5 mm.

4. The method according to claim 1, wherein, the run-in coating is treated to reduce reflections before measuring the mass and optically measuring the coated housing component.

5. The method according to claim 1, further comprising the steps of:

providing a basic body that is different than the housing component;

thermally spraying a run-in coating on the basic body in parallel with the housing component;

determining a density of the run-in coating on the basic body and the run-in coating on the housing component in the same way.

6. The method according to claim 5, further comprising the step of:

heat treating the run-in coating on the housing component and heat treating the run-in coating on the basic body after the step of determining the difference in the mass and volume of the run-in coating of the housing component and basic body before and after coating.

7. The method according to claim 1, further comprising the steps of:

providing a holder for arranging the housing component;

optically measuring the volume of the housing component arranged in the holder;

weighing a mass of the housing component arranged in the holder.

\* \* \* \* \*